US010261315B2

(12) United States Patent
Miyatake et al.

(10) Patent No.: US 10,261,315 B2
(45) Date of Patent: Apr. 16, 2019

(54) OPTICAL SCANNING APPARATUS AND IMAGE DISPLAY APPARATUS

(71) Applicants: Naoki Miyatake, Kanagawa (JP); Naoki Nakamura, Saitama (JP); Tadashi Nakamura, Kanagawa (JP)

(72) Inventors: Naoki Miyatake, Kanagawa (JP); Naoki Nakamura, Saitama (JP); Tadashi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 324 days.

(21) Appl. No.: 15/188,028

(22) Filed: Jun. 21, 2016

(65) Prior Publication Data

US 2017/0003506 A1    Jan. 5, 2017

(30) Foreign Application Priority Data

Jul. 3, 2015    (JP) .................................. 2015-134083

(51) Int. Cl.
  *G02B 27/01*    (2006.01)
  *B60K 35/00*    (2006.01)
  *G02B 26/10*    (2006.01)

(52) U.S. Cl.
  CPC .......... *G02B 27/0101* (2013.01); *B60K 35/00* (2013.01); *G02B 26/10* (2013.01); *B60K 2350/2047* (2013.01); *G02B 2027/014* (2013.01); *G02B 2027/0118* (2013.01); *G02B 2027/0145* (2013.01); *G02B 2027/0154* (2013.01)

(58) Field of Classification Search
  CPC ................ G02B 27/0101; G02B 26/10; G02B 2027/0118; G02B 2027/014; G02B 2027/0145; G02B 2027/0154; B60K 35/00; B60K 2350/2047
  See application file for complete search history.

(56) References Cited

U.S. PATENT DOCUMENTS

| 5,680,254 | A | 10/1997 | Ueda et al. |
| RE42,865 | E | 10/2011 | Suzuki et al. |
| 2002/0001118 | A1 | 1/2002 | Nakajima et al. |
| 2002/0149666 | A1 | 10/2002 | Amada et al. |
| 2003/0156310 | A1 | 8/2003 | Suzuki et al. |
| 2003/0206322 | A1 | 11/2003 | Atsuumi et al. |
| 2003/0214693 | A1 | 11/2003 | Hayashi et al. |
| 2004/0001241 | A1 | 1/2004 | Hayashi et al. |
| 2004/0165240 | A1 | 8/2004 | Suzuki et al. |

(Continued)

FOREIGN PATENT DOCUMENTS

| JP | 2009-163122 | 7/2009 |
| JP | 2013-015738 | 1/2013 |

OTHER PUBLICATIONS

U.S. Appl. No. 15/066,448, filed Mar. 10, 2016.

*Primary Examiner* — Sahlu Okebato
(74) *Attorney, Agent, or Firm* — Oblon, McClelland, Maier & Neustadt, L.L.P.

(57) ABSTRACT

An optical scanning apparatus includes a light source to emit light, a light deflector having a reflection face to deflect the light as a scan-use light to scan an image generation element by oscillating the reflection face, a light receiving element to receive a control-use light to generate a signal used for controlling a scanning condition of the scan-use light, and a control unit to control the scanning condition of the light deflector based on the generated signal.

15 Claims, 9 Drawing Sheets

(56) References Cited

U.S. PATENT DOCUMENTS

| | | |
|---|---|---|
| 2004/0184127 A1 | 9/2004 | Nakajima et al. |
| 2004/0240000 A1 | 12/2004 | Miyatake et al. |
| 2005/0094234 A1 | 5/2005 | Miyatake et al. |
| 2005/0225819 A1 | 10/2005 | Atsuumi et al. |
| 2006/0000990 A1 | 1/2006 | Hayashi et al. |
| 2006/0203264 A1 | 9/2006 | Miyatake |
| 2006/0209166 A1 | 9/2006 | Suzuki et al. |
| 2006/0291026 A1 | 12/2006 | Miyatake |
| 2007/0002417 A1 | 1/2007 | Hirakawa et al. |
| 2007/0030538 A1 | 2/2007 | Hirakawa et al. |
| 2007/0081216 A1 | 4/2007 | Miyatake |
| 2007/0146849 A1 | 6/2007 | Miyatake et al. |
| 2007/0215800 A1 | 9/2007 | Miyatake et al. |
| 2007/0216754 A1 | 9/2007 | Miyatake |
| 2008/0055690 A1 | 3/2008 | Nakamura et al. |
| 2008/0062491 A1 | 3/2008 | Nakamura et al. |
| 2008/0062493 A1 | 3/2008 | Miyatake |
| 2008/0068691 A1 | 3/2008 | Miyatake |
| 2008/0180772 A1 | 7/2008 | Miyatake et al. |
| 2008/0192323 A1 | 8/2008 | Nakamura et al. |
| 2008/0204841 A1 | 8/2008 | Suzuki et al. |
| 2008/0218829 A1 | 9/2008 | Nakamura |
| 2009/0015897 A1 | 1/2009 | Nakamura et al. |
| 2009/0073523 A1 | 3/2009 | Nakamura |
| 2009/0073528 A1 | 3/2009 | Miyatake |
| 2009/0074459 A1 | 3/2009 | Nakamura et al. |
| 2009/0168132 A1 | 7/2009 | Miyatake |
| 2009/0201358 A1 | 8/2009 | Nakamura |
| 2010/0091083 A1 | 4/2010 | Itami et al. |
| 2010/0091342 A1 | 4/2010 | Nakamura |
| 2011/0058230 A1 | 3/2011 | Soeda et al. |
| 2011/0063704 A1 | 3/2011 | Miyatake |
| 2012/0177409 A1 | 7/2012 | Arai et al. |
| 2012/0236380 A1 | 9/2012 | Miyatake et al. |
| 2013/0016171 A1 | 1/2013 | Nakamura et al. |
| 2013/0083148 A1 | 4/2013 | Miyatake et al. |
| 2013/0147895 A1 | 6/2013 | Miyatake |
| 2013/0201536 A1 | 8/2013 | Nakamura et al. |
| 2013/0235143 A1 | 9/2013 | Itami et al. |
| 2014/0009555 A1* | 1/2014 | Itami .................. G02B 26/12 347/261 |
| 2014/0177022 A1* | 6/2014 | Saisho ............... G02B 26/101 359/205.1 |
| 2014/0204166 A1 | 7/2014 | Itami et al. |
| 2015/0097910 A1 | 4/2015 | Itami et al. |
| 2015/0261120 A1 | 9/2015 | Fujii et al. |
| 2015/0268462 A1 | 9/2015 | Itami et al. |
| 2015/0346487 A1 | 12/2015 | Miyatake et al. |
| 2016/0116735 A1 | 4/2016 | Hayashi et al. |

* cited by examiner though such
OPTICAL SCANNING APPARATUS AND IMAGE DISPLAY APPARATUS

CROSS-REFERENCE TO RELATED APPLICATION

This application claims priority pursuant to 35 U.S.C. § 119(a) to Japanese Patent Application No. 2015-134083 filed on Jul. 3, 2015 in the Japan Patent Office, the disclosure of which are incorporated by reference herein in their entirety.

BACKGROUND

Technical Field

The present invention relates to an optical scanning apparatus and an image display apparatus.

Background Art

Image display apparatuses such as head up displays (HUD) are disposed to transportation vehicles such as automobiles, airplanes, and ships. The HUD can generate an intermediate image, and project and display the generated intermediate image on a windshield to provide information to an operator such as a driver.

The HUD can employ a panel system and a laser scanning system as a projection system of the intermediate image. As to the panel system, an imaging device such as a liquid crystal device and a digital mirror device projects the intermediate image. As to the laser scanning system, a light source unit including a laser diode (light emitter) emits a laser beam, and then a two dimensional scanning device scans a target scan surface by using the laser beam to project the intermediate image. As to the panel system, an image is formed by partially blocking the light from the light emitters by using the imaging device. As to the laser scanning system, an image is formed by controlling the light emission of the light emitters pixel by pixel, and thereby a high contrast image can be formed.

As to the head up display (HUD) using the laser scanning system, image visibility can be increased by adjusting the light emission luminance of an image based on brightness of background of the displayed image. However, if the dynamic range of the light source such as a laser diode is not sufficient, image quality may deteriorate.

Further, as to the head up display (HUD) employing the laser scanning system, it is required to acquire a control signal to control an emission timing of the laser diode to generate an image at a desired position. Typically, the control signal can be generated by receiving the light, emitted from the laser diode and used for the scanning, by a light receiving element.

However, as described above, if the light quantity of the light that irradiates the target scan surface becomes too little, the light quantity of the light received by the light receiving element becomes lower, with which the control signal used for controlling the emission timing of the laser diode cannot be acquired, with which image quality is degraded.

SUMMARY

As one aspect of the present invention, an optical scanning apparatus is devised. The optical scanning apparatus includes a light source to emit light, a light deflector having a reflection face to deflect the light as a scan-use light to scan the image generation element by oscillating the reflection face, a light receiving element to receive a control-use light to generate a signal used for controlling a scanning condition of the scan-use light, and a control unit to control the scanning condition of the light deflector based on the generated signal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
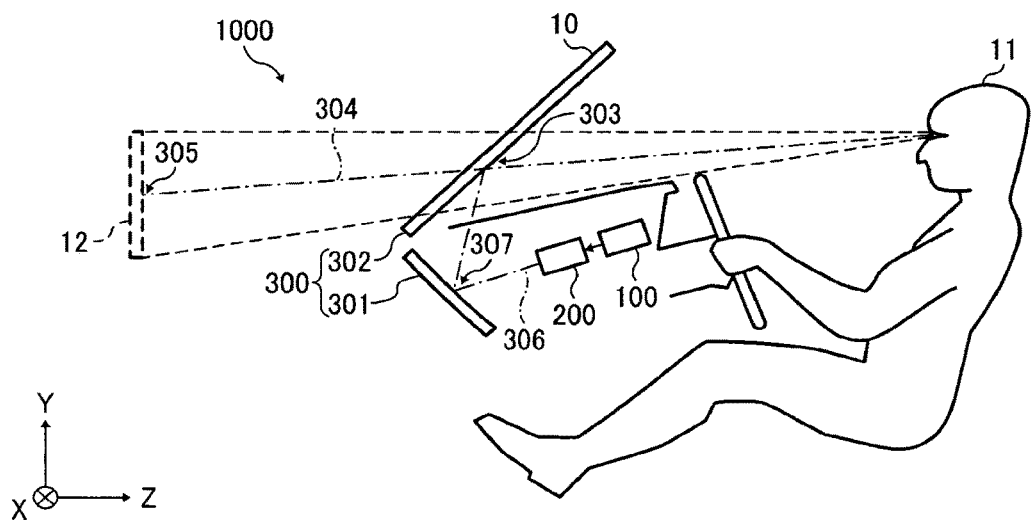
FIG. 1 is an example of a head up display (HUD) used as image display apparatus according to one or more example embodiments of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, apparatus or system according to one or more example embodiments are described hereinafter.

A description is given of an optical scanning apparatus and an image display apparatus according to one or more example embodiments with reference to the drawings.

Image Display Apparatus

As illustrated in FIG. 1, the image display apparatus such as a head up display (HUD) 1000 includes, for example a light source unit 100, an optical scanning system 200, and an optical projection system 300.

Overall Configuration of HUD

The HUD 1000 can be mounted to, for example, vehicles used for various applications including transportation vehicles such as automobiles, ships, and airplanes but not limited these. Hereinafter, a description is given of the HUD 1 mountable to an automobile. Hereinafter, the automobile is used as an example of transportation vehicles, which are simply referred to as the vehicle. The HUD 1 can be applied to various fields such as commercial vehicles, agricultural/construction machines, railway vehicles, airplanes, and robots, which are movable object. Further, the HUD 1 can be applied to other fields such as factory machines, factory robots, etc. which may be fixed at one place.

As to the one or more example embodiments of this disclosure, the three dimensional rectangular coordinate system is defined as follows. As illustrated in FIG. 1, the left-to-right direction of the field of view of the user 11 is set as the X-axis direction, in which the right hand side of the user 11 is set as +X direction, and the left hand side of the user 11 is set as −X direction. Further, the upper-to-lower direction of the field of view of the user 11 is set as Y-axis direction, in which the upper direction of the user 11 is set as +Y direction, and the lower direction of the user 11 is set as −Y direction. Further, the depth direction of the field of view of the user 11 that is a travel direction of the vehicle is set as Z-axis direction, in which the front direction of the travel direction is set as −Z direction, and the rear direction of the travel direction is set as +Z direction. Therefore, as to the three dimensional rectangular coordinate system of the one or more example embodiments, the width direction of the vehicle is set as the X-axis direction, the height direction of the vehicle is set as the Y-axis direction, and the length direction of the vehicle is set as the Z-axis direction.

The HUD 1000 can display or project various information such as information of operations and controls of the vehicle on a windshield 10 as a virtual image 12, with which a user 11 (observer) can recognize the information. The windshield 10 can be a transmissive reflective element that can pass through a part of light that enters the windshield 10, and reflect a part of the remaining light, in which the windshield 10 can be used as a combiner 302.

The light source unit 100 emits image displaying beam to the optical scanning system 200 and the optical projection system 300 to generate the virtual image 12.

Based on the image displaying beam emitted from the light source unit 100, the optical scanning system 200 generates image projection light used for displaying operational information of the vehicle. The image projection light generated by using the optical scanning system 200 can be projected onto the windshield 10 useable as the combiner 302. The optical scanning system 200 will be described in detail later.

The optical projection system 300 includes, for example, a concave mirror 301 and the combiner 302. Since the optical projection system 300 is used to form the virtual image 12 by projecting the image projection light to the combiner 302 from the concave mirror 301, the optical projection system 300 can be referred to a virtual image optical system. If the windshield 10 is not a flat face member, the virtual image 12 displayed on the windshield 10 by projecting the image projection light is distorted. The concave mirror 301 is a single mirror disposed at a space between the optical scanning system 200 and the combiner 302 to correct the distortion of the virtual image 12. By disposing the concave mirror 301, an optical distortion that the horizontal line of the intermediate image becomes a convex shape into the upper or lower can be corrected.

In this description, the windshield 10 of the vehicle such as automobile is also used as the combiner 302, but not limited hereto. For example, instead of using the windshield 10 as the combiner 302, a separate transmissive reflection element, which is a partially-reflectable mirror, can be used as the combiner 302 that can pass through a part of light that enters the combiner 302, and reflect a part of the remaining light. Hereinafter, it is assumed that the optical projection system 300 projects the image projection light to any one of the windshield 10 and the combiner 302.

Typically, the windshield 10 of the vehicle is slanted to +Z-axis direction on the YZ plane in the field of the view of the user 11 as illustrated in FIG. 1. In this configuration, the upper side of the windshield 10 is close to the user 11 while the lower side of the windshield 10 is far from the user 11. Further, the windshield 10 has a curved shape along the left-to-right direction in the field of the view of the user 11. Therefore, if the vehicle is a right-hand drive vehicle, the curved windshield 10 becomes closer to the user 11 at the right end of the left-to-right direction in the field of the view of the user 11.

When the image projection light is projected onto the combiner 302, the virtual image 12 can be appeared in the field of view of the user 11 at a position physically distanced from the combiner 302, which is at the position distanced from the user 11 for some distance. Information related to operations of the vehicle such as navigational information of the vehicle including velocity, travel distance, destination display can be displayed as the virtual image 12.

When the windshield 10 is used as the combiner 302 to project the image projection light, the HUD 1000 employs a windshield projection system. Further, when the transmissive reflection element (partially-reflectable mirror) is used as the combiner 302 separately from the windshield 10, the HUD 1000 employs a combiner projection system. When the HUD 1000 is mounted in the vehicle, the windshield projection system may be preferable from a viewpoint of interior appearance of the vehicle. For example, if the combiner projection system is employed for the vehicle, the separately-disposed combiner may become a prominent object in the vehicle, and may partially block the field of view of the user 11 depending on the design of the combiner.

The optical scanning system 200 that generates the intermediate image on the combiner 302 by projecting the image projection light to the combiner 302 can be embedded, for example, in a dashboard of the vehicle. The observing point of the user 11 is used as a reference position of the observing point, which indicates a reference eye point. The field of view of the user 11 is set with a level of eye range of drivers for automobiles or less defined by national standards such as Japan Industrial Standard (JIS) D0021.

Further, the image display apparatus such as the HUD 1000 according to one or more example embodiments of this disclosure can omit the optical projection system 300, in which an image, generated directly from the light emitted from the light source unit 100, can be formed on a screen such as the windshield of the vehicle.

A description is given of positioning of the image projection light and the virtual image 12 for the HUD 1000. As to the HUD 1000, the concave mirror 301 and the combiner 302 configure the optical projection system 300, in which the center of incidence area of the image projection light directed from the concave mirror 301 to the combiner 302 is set as an incidence area center 303. Further, as to the HUD 1000, the center of the virtual image 12 is set as a virtual image center 305. A tangential plane at the incidence area center 303 is slanted with respect to a first virtual axis 304, which is a line virtually connecting the observing point of the user 11 and the virtual image center 305 when viewed from the X-axis direction. Further, the tangential plane at the incidence area center 303 is slanted with respect to the first virtual axis 304 when viewed from the Y-axis direction. In this configuration, the first virtual axis 304 is an axis that passes through the incidence area center 303.

An axis virtually connecting the center of the intermediate image generated in the optical scanning system 200 (i.e., the center of scan target face to be described later) and the center of a reflection face 307 is referred to a second virtual axis 306. In this configuration, the second virtual axis 306 is slanted with respect to the first virtual axis 304 when viewed from the X-axis direction. Further, the second virtual axis 306 is slanted with respect to the first virtual axis 304 when viewed from the Y-axis direction. Further, in this description, the center of scan target face means the center of effective scanning area on a scan-receiving element 202 to be described later.

Hardware Configuration

Figure 2:
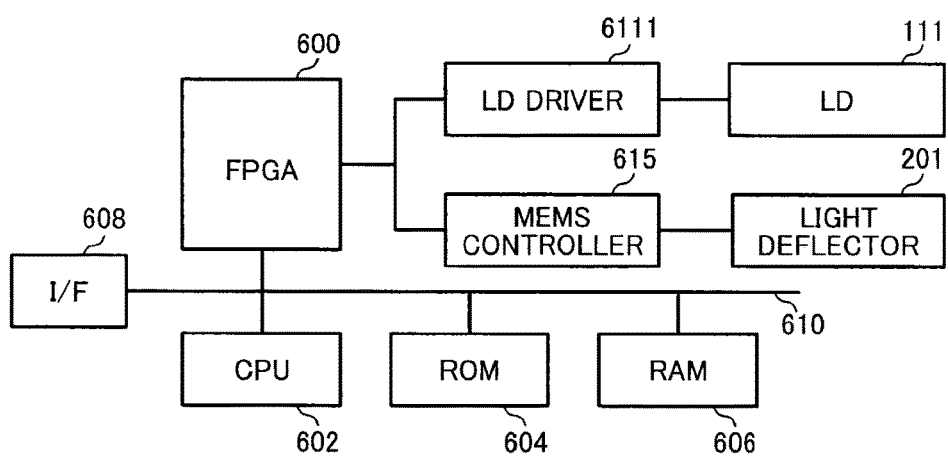
FIG. 2 is a hardware configuration of the HUD of FIG. 1.

As illustrated in FIG. 2, a hardware configuration of the HUD 1000 includes, for example, a field-programmable gate array (FPGA) 600, and a central processing unit (CPU) 602. Further, the HUD 1000 includes, for example, a read only memory (ROM) 604, a random access memory (RAM) 606, an interface (I/F) 608, and a bus line 610. Further, the HUD 1000 includes, for example, a laser diode (LD) driver 6111, and a MEMS controller 615.

The FPGA 600 controls the LD driver 6111 and the MEMS controller 615. The LD driver 6111 activates and deactivates a laser diode (LD) 111 of the light source unit 100 under the control of the FPGA 600. The MEMS controller 615 activates and deactivates the light deflector 201 under the control of the FPGA 600. The CPU 602 controls each of units of the HUD 1000. The ROM 604 stores image processing programs to be executed to control each of units of the HUD 1000 by using the CPU 602. The RAM 606 is used as a working area of the CPU 602. The I/F 608 is used as an interface to communicate with an external device such as an external controller. The I/F 608 can be used to connect the HUD 1000 to a network inside the vehicle such as controller area network (CAN).

Functional Configuration

Figure 3:
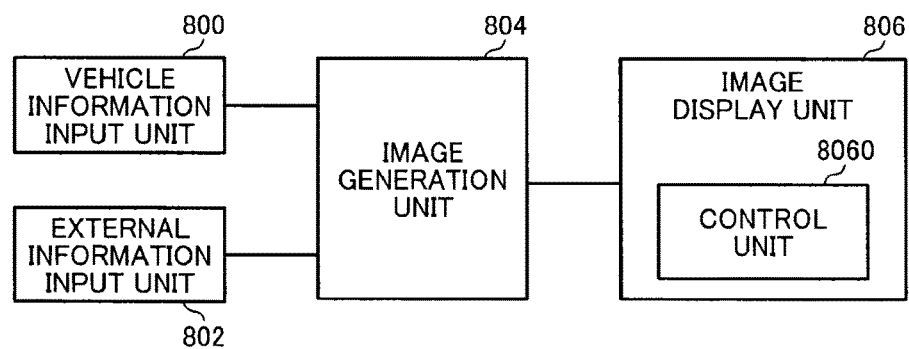
FIG. 3 is a functional configuration of the HUD of FIG. 1.

As illustrated in FIG. 3, the functional configuration of the HUD 1000 includes, for example, a vehicle information input unit 800, an external information input unit 802, an image generation unit 804, and an image display unit 806. The vehicle information input unit 800 can be input with vehicle information (e.g., velocity, travel distance) from a controller area network (CAN) of the vehicle. The external information input unit 802 can be input with information outside the vehicle (i.e., external information) from an external network such as positioning information from the global positioning system (GPS). The image generation unit 804 can generate an image based on information input from the vehicle information input unit 800 and the external information input unit 802. The image display unit 806 includes a control unit 8060 that controls operations of the light source unit 100 and the optical scanning system 200. Under the control of the control unit 8060, the image projection light can be projected onto the windshield 10 by using the HUD 1000. With employing the above described functional configuration, the virtual image 12 can be visually recognized in the field of view of the user 11 when the HUD 1000 is activated.

Light Source Unit

A description is given of the light source unit 100 employed for the HUD 1000.

Figure 4:
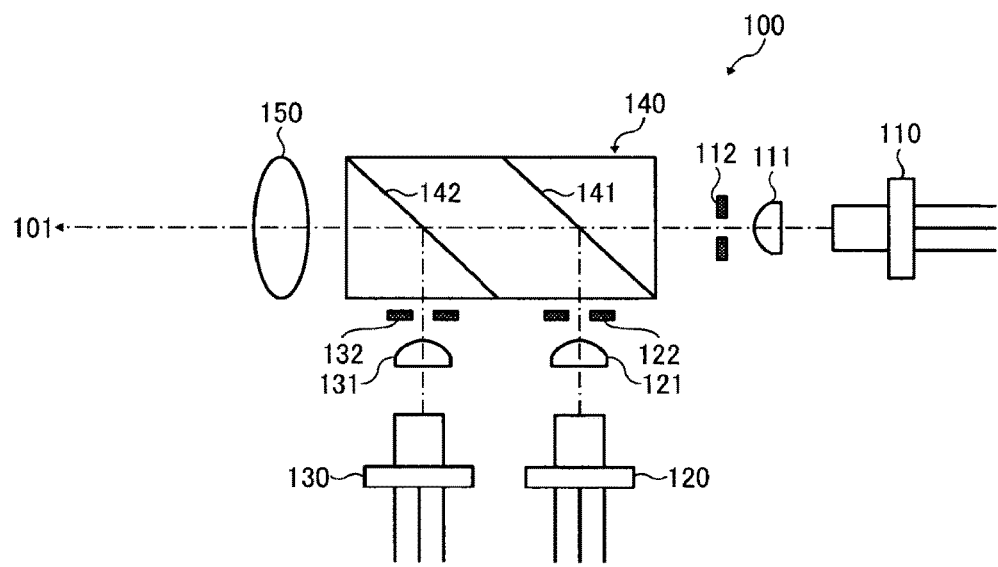
FIG. 4 is a hardware configuration of a light source unit of the HUD of FIG. 1.

As illustrated in FIG. 4, the light source unit 100 emits an image displaying beam 101 to generate the virtual image 12 such as a color image. The image displaying beam 101 is a light beam that is generated by synthesizing light beams of three colors of red (R), green (G), and blue (B).

The light source unit 100 includes, for example, a first laser element 110, a second laser element 120, and a third laser element 130, which are semiconductor laser elements that respectively emit light beams of three colors of red (R), green (G), and blue (B). The first laser element 110 emits red laser light for generating red images. The second laser element 120 emits green laser light for generating green images. The third laser element 130 emits blue laser light for generating blue images.

Each of the laser elements can employ a laser diode (LD) such as an edge emitting laser (EEL). Further, instead of the edge emitting laser (EEL), each of the laser elements can employ a vertical cavity surface emitting laser (VCSEL) but not limited thereto.

Further, instead of the above described semiconductor laser elements, light emitting diode (LED) elements can be employed for the light emitters.

Further, the light source unit 100 includes, for example, a first coupling lens 111, a second coupling lens 121, and a third coupling lens 131.

The first coupling lens 111 suppresses the diffusion of laser light emitted from the first laser element 110, the second coupling lens 121 suppresses the diffusion of laser light emitted from the second laser element 120, and the third coupling lens 131 suppresses the diffusion of laser light emitted from the third laser element 130.

Further, the light source unit 100 includes, for example, a first aperture 112, a second aperture 122, and a third aperture 132. The first aperture 112 shapes the laser light by regulating the light flux diameter of the laser light coming from the first coupling lens 111, the second aperture 122 shapes the laser light by regulating the light flux diameter of the laser light coming from the second coupling lens 121, and the third aperture 132 shapes the laser light by regulating the light flux diameter of the laser light coming from the third coupling lens 131.

Further, the light source unit 100 includes, for example, a synthesizing prism 140 that synthesizes the shaped laser light of each of the colors as the image displaying beam 101, and emits the image displaying beam 101. The synthesizing prism 140 includes, for example a first dichroic layer 141 that passes through the red laser light that has passed through the first aperture 112, and reflects the green laser light that has passed through the second aperture 122. Further, the synthesizing prism 140 includes, for example, a second dichroic layer 142 that passes through the red and green laser light, and reflects the blue laser light that has passed through the third aperture 132. Further, the light source unit 100 includes, for example, a lens 150 to guide the image displaying beam 101 coming from the synthesizing prism 140.

A description is given of a process of generating the image displaying beam 101 at the light source unit 100. Specifically, the red laser light emitted from the first laser element 110 enters the synthesizing prism 140 via the first coupling lens 111 and the first aperture 112. Then, the red laser light that has entered the synthesizing prism 140 passes through the first dichroic layer 141 and travels straight.

The green laser light emitted from the second laser element 120 enters the synthesizing prism 140 via the second coupling lens 121 and the second aperture 122. Then, the green laser light that has entered the synthesizing prism 140 is reflected at the first dichroic layer 141, and is then guided to the same direction with the red laser light, which is the direction to the second dichroic layer 142.

The blue laser light emitted from the third laser element 130 enters the synthesizing prism 140 via the third coupling lens 131 and the third aperture 132. The blue laser light that has entered the synthesizing prism 140 is reflected to the same direction of the red laser light and the green laser light at the second dichroic layer 142.

When the red laser light and the green laser light that has passed through the second dichroic layer 142, and the blue laser light reflected at the second dichroic layer 142 are synthesized as one laser light (i.e., image displaying beam 101), the image displaying beam 101 is emitted from the synthesizing prism 140. The image displaying beam 101 emitted from the synthesizing prism 140 is guided to the optical scanning system 200 (FIG. 1) through the lens 150.

Further, the intensity modulation is performed for the laser light of each of colors of R, G, B configuring the image displaying beam 101 based on image signals corresponding to "two dimensional color image" that is a target display image of the HUD 1000, or image data indicating the image information. The intensity modulation of the laser light can be performed by directly modulating the laser elements of each of colors (direct modulation method) or by modulating laser light emitted from each of the laser elements each of colors (external modulation method). Each of the laser elements can be driven by a drive unit. Therefore, the drive unit drives each of the laser elements to emit laser light of each of colors processed by the intensity modulation based on image signals of each of colors of R, G, and B.

Optical Scanning System: First Example Embodiment

A description is given of the optical scanning system 200 of a first example embodiment employed for the HUD 1000, which is an example of the optical scanning apparatus.

Figure 5:
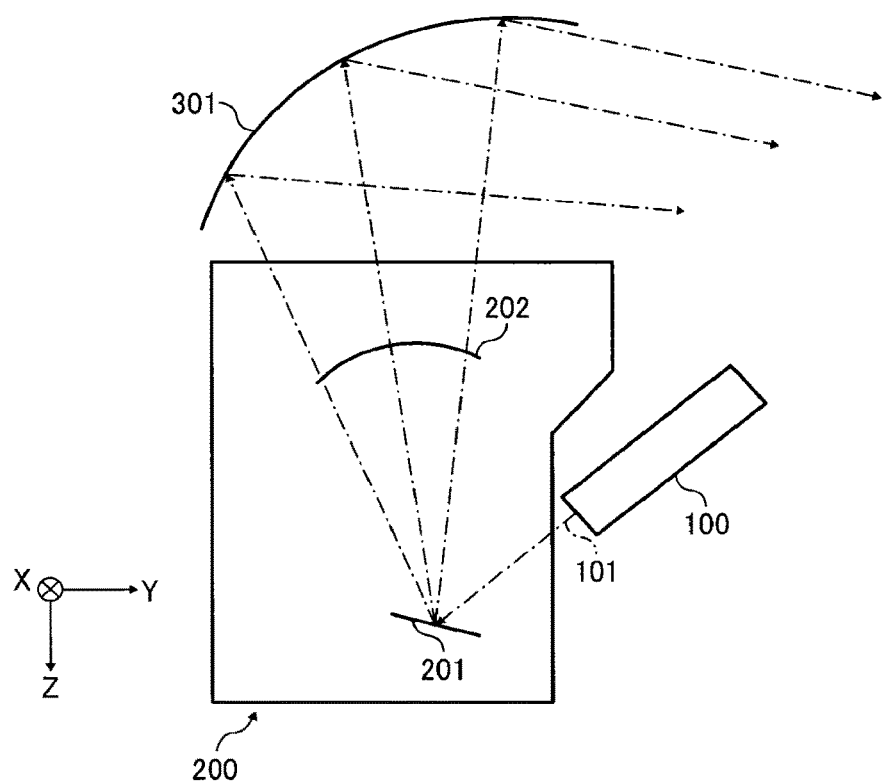
FIG. 5 is a schematic configuration of an optical scanning system of a first example embodiment viewed from the X-axis direction.
Figure 6:
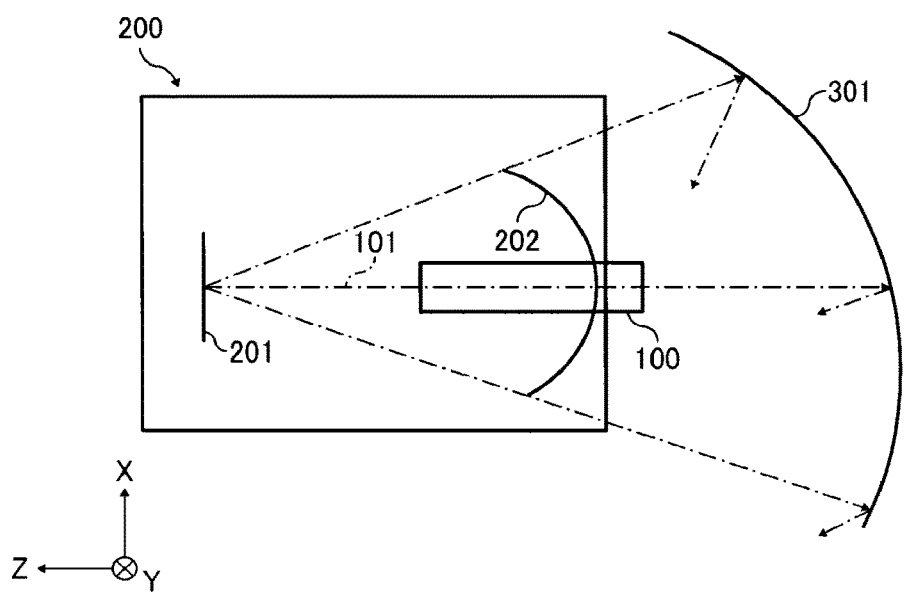
FIG. 6 is a schematic configuration of the optical scanning system of the first example embodiment viewed from the Y-axis direction.

FIG. 5 is a schematic configuration of the optical scanning system 200 viewed from the X-axis direction. Further, FIG. 6 is a schematic configuration of the optical scanning system 200 viewed from the Y-axis direction. As illustrated in FIGS. 5 and 6, the optical scanning system 200 includes, for example, the light deflector 201 and the scan-receiving element 202.

The light deflector 201 can be used as a deflector that deflects the image displaying beam 101 emitted from the light source unit 100 two dimensionally. The light deflector 201 can be configured with a plurality of micro mirrors oscillatable into a plurality of directions such as the oscillation about two axes perpendicular with each other, in which the plurality of micro mirrors is collectively used as reflection faces. The light deflector 21 can employ micro electro mechanical systems (MEMS) device having micro-oscillation mirror elements manufactured by the semiconductor manufacturing process. For example, the light deflector 21 is composed of micro reflectors (hereinafter, micro mirrors) arranged in a matrix pattern. Each of the micro mirrors is configured to oscillate about two axes perpendicular with each other, and the micro-oscillation mirror elements are known as a digital micro mirror device (DMD: registered mark of Texas Instruments).

Further, the configuration of the light deflector 21 is not limited to the above described example configuration. For example, the light deflector 21 can employ a configuration having two micro mirrors disposed for one axis to oscillate the two micro mirrors in directions perpendicular with each other about the one axis.

The scan-receiving element 202 is curved toward the concave mirror 301 (FIG. 5) in the long side direction of the scan-receiving element 202 alone, or in the long side direction and the short side direction of the scan-receiving element 202. The scan-receiving element 202 can be configured with a number of micro convex lenses.

With employing this "micro convex lens structure" for the scan-receiving element 202, the image displaying beam 101 that has entered the scan-receiving element 202 can be diffused at an exit face of the scan-receiving element 202 and emitted to the optical projection system 300. The image displaying beam 101 emitted from the scan-receiving element 202 as the diffused light can be projected to a broader area setting an incidence area center 303 as the center including the field of the view of the user 11 by using the combiner 302. By irradiating the image displaying beam 101 to an area having the incidence area center 303 as the center, the virtual image 12 can be displayed at the virtual image center 305, with which the user 11 can visually recognize the virtual image 12 effectively even if the observing point of the user 11 is moved when the user 11 moves the head.

Further, the structure of the scan-receiving element 202 is not limited to the micro convex lens structure such as the micro lens array. For example, the scan-receiving element 202 can employ a diffusion plate, a transmittable screen, and a reflective screen. In this description, the scan-receiving element 202 employs the micro lens array, and thereby a plurality of micro lenses is arranged two dimensionally, and further, instead of the two dimensional arrangement, the plurality of micro lenses can be arranged one dimensionally or three dimensionally.

The image displaying beam 101 deflected by the light deflector 201 enters the scan-receiving element 202 while the image displaying beam 101 moves in parallel directions. The scan-receiving element 202 is scanned two dimensionally by the image displaying beam 101. As to the two dimensional directions of the scan-receiving element 202 scanned by the image displaying beam 101, the X-axis direction is set as a first direction, and Y-axis direction perpendicular to the X-axis direction is set as a second direction, in which the scan-receiving element 202 is scanned along the first direction and the second direction. The X-axis direction is parallel to the lateral direction of to-be-scanned image, and the Y-axis direction is parallel to the vertical direction of to-be-scanned image. Hereinafter, it is assumed that a to-be-scanned image has a longer side for the lateral direction and a shorter side for the vertical direction, which means the image has a rectangular shape. Further, The X-axis direction can be referred to the main scanning direction, and the Y-axis direction can be referred to the sub-scanning direction. When the to-be-scanned image has the rectangular shape, the deflection angle of the light deflector 201 in the main scanning direction becomes greater than the deflection angle of the light deflector 201 in the sub-scanning direction.

The scan-receiving element 202 can be scanned two dimensionally such as the main scanning direction and sub-scanning direction by using the scan beam. Specifically, the scan-receiving element 23 can be scanned with a high speed in the main scanning direction and with a low speed in the sub-scanning direction, which is known as raster scanning. The intermediate image can be generated by performing the two dimensional scanning on the scan-receiving element 202 in the HUD 1000. In this description, it is assumed that a two dimensional color image is generated by using the scan-receiving element 202.

In this description, it is assumed that the color image is generated by using the scan-receiving element 202, but a monochrome image can be generated by using the scan-receiving element 202. Further, image displayed on the scan-receiving element 202 at each moment corresponds to "pixels that are irradiated by the image displaying beam 101 at the each moment." Therefore, the "two dimensional color image" corresponds to "a group of pixels displayed at each moment" by performing the two dimensional scanning using the image displaying beam 101.

Light Deflector

Figure 7:
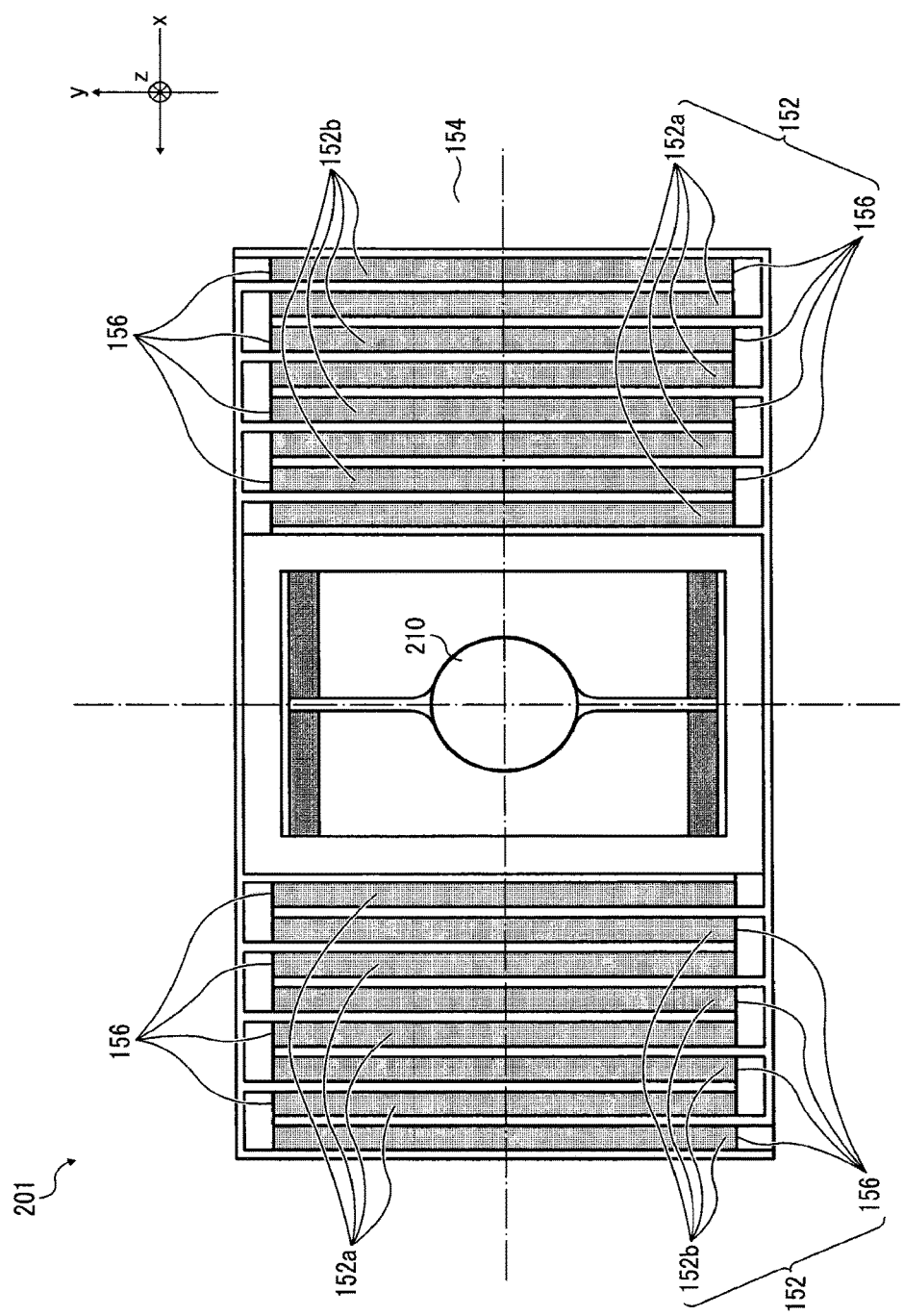
FIG. 7 is an example of a light deflector of the optical scanning system.

As illustrated in FIG. 7, the light deflector 201 includes a micro mirror 210, which is a MEMS mirror manufactured by the semiconductor manufacturing process. In the configuration of FIG. 7, the long side direction of the light deflector 201 is set as x-axis, the short side direction of the light deflector 201 is set as y-axis, and the traveling direction of the light reflected from the light deflector 201 perpendicular to the x-axis and y-axis is set as z-axis. The x-axis, y-axis, and z-axis of FIG. 7 are different from the X-axis direction, the Y-axis direction, and the Z-axis direction of FIG. 1.

As illustrated in FIG. 7, the light deflector 201 includes a pair of zig-zag units 152. Each of the zig-zag units 152 is disposed at each side of the micro mirror 210, and each of the zig-zag units 152 includes a plurality of zig-zag beams arranged with a zig-zag pattern. As illustrated in FIG. 7, each of the zig-zag units 152 includes a plurality of first beams 152a and a plurality of second beams 152b, and the first beams 152a and the second beam 152b are adjacently positioned with each other. Further, the zig-zag units 152 are supported by a frame 154 as illustrated in FIG. 7.

As illustrated in FIG. 7, a pair of the first beam 152a and the second beam 152b adjacently positioned with each other is disposed with a piezoelectric device 156 such as lead zirconate titanate (PZT). By applying one voltage to the piezoelectric device 156 on the first beam 152a and another voltage to the piezoelectric device 156 on the second beam 152b, which are adjacent beams with each other, warping can be generated at the first beam 152a and the second beam 152b. The adjacent beams can deform different directions with an effect of this warping, and then the micro mirror 210 rotates about the x-axis with a greater angle with an effect of accumulated deformation.

By using the light deflector 201 having the above described configuration, the optical scanning in the vertical direction about the x-axis can be performed with a lower voltage. Further, the optical scanning in the horizontal direction about the y-axis can be performed by a torsion bar connected to the micro mirror 210, in which resonance is used.

Configuration and Arrangement of Optical Scanning System

A description is given of an optical configuration and arrangement of the optical scanning system 200. The optical scanning system 200 includes, for example, the micro mirror 210. When the image displaying beam 101 emitted from the light source unit 100 scans the scan-receiving element 202 two dimensionally by activating the light deflector 201, the image displaying beam 101 is being focused on an image generation element 206 disposed on the scan-receiving element 202. The image generation element 206 is, for example, an image sensor such as a charge coupled device image sensor.

Figure 8A:
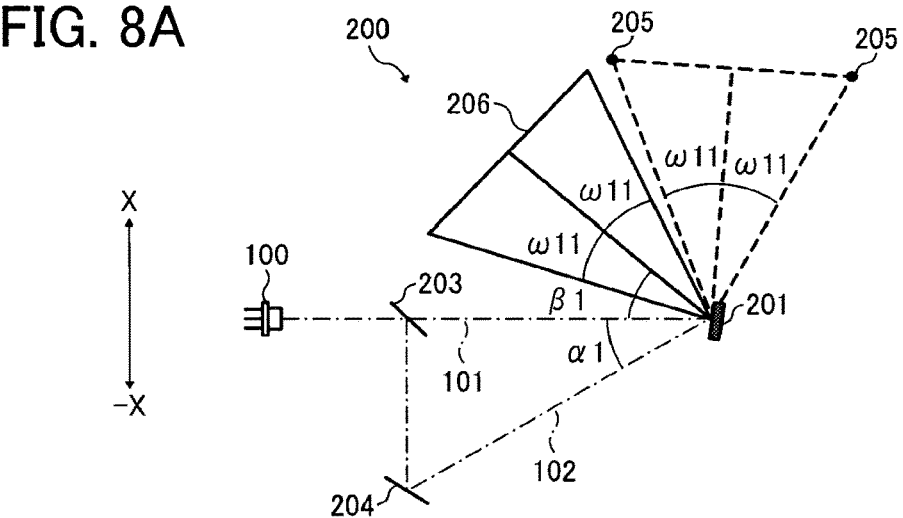
FIG. 8A is a cross-section view of an optical arrangement in the X-axis direction in the optical scanning system of the first example embodiment.

FIG. 8A is a cross-section view of an optical arrangement in the main scanning direction that is the X-axis direction in the optical scanning system 200. As illustrated in FIG. 8A, the optical scanning system 200 includes, for example, at least one light receiving element 205 that receives the light (hereinafter, "control-use light 102") to obtain a control signal used for controlling the scanning operation condition. The scanning operation condition of the optical scanning system 200 includes, for example, a scan timing of the image displaying beam 101 at the image generation element 206.

As illustrated in FIG. 8A, the optical scanning system 200 further includes a light separator such as light flux separating element 203 at a position on a light path between the light source unit 100 and the light deflector 201. The light flux separating element 203 separates the light coming from the light source unit 100 into the image displaying beam 101 (i.e., scan-use light) to be directed to the image generation element 206, and the control-use light 102 to be directed to the light receiving element 205. With employing this configuration, a travel direction of the image displaying beam 101 (i.e., scan-use light) and a travel direction of the control-use light 102 can be set to different directions. After the separation, each of the image displaying beam 101 and the control-use light 102 enters the light deflector 201, in which the image displaying beam 101 is deflected by the light deflector 201 toward the image generation element 206 to scan the image generation element 206 while the control-use light 102 is then reflected by a reflection mirror 204 and then deflected by the light deflector 201 toward the light receiving element 205. As to the optical scanning system 200 of the one or more example embodiments, the control-use light 102 enters a part or the entire of the micro mirrors 210 (i.e., a number of micro mirrors) configuring the light deflector 201, and is reflected to the light receiving element 205.

As to the one or more example embodiments, the light source unit 100 can be configured as illustrated in FIG. 2, and thereby the description of the light source unit 100 is omitted from the following description.

As to the optical scanning system 200, the optical scanning system 200 is designed to enter a light emitted from the light source unit 100 to the light deflector 201 with an angle outside the deflection angle range in the main scanning direction by the light deflector 201 as illustrated in FIG. 8A.

Figure 9:
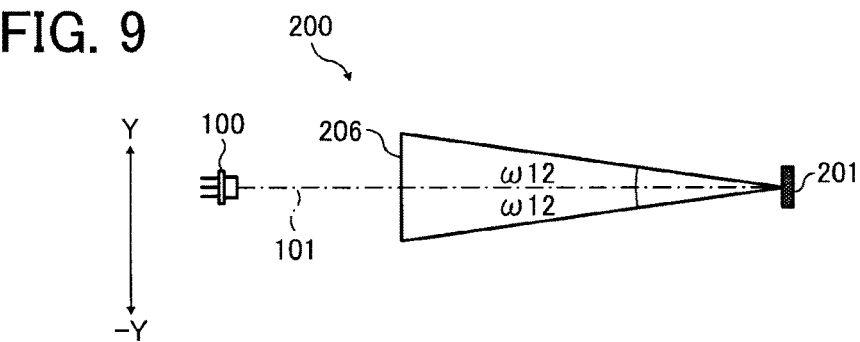
FIG. 9 is a cross-section view of an optical arrangement in the Y-axis direction in the optical scanning system of FIG. 8A.

FIG. 9 is a cross-section view of an optical arrangement in the sub-scanning direction that is the Y-axis direction in the optical scanning system 200. When the light enters the light deflector 201, the light deflector 201 deflects the incident light to two-axes directions perpendicular to the incident light to perform the scanning. The deflection angle ranges of the light deflector 201 for the two axes are, for example, ±13 (deg) and ±5 (deg). In this example case, the direction of the deflection angle range of the mirror face set with ±13 (deg) angle is used for the main scanning direction, and the direction of the deflection angle range of the mirror face set with ±5 (deg) angle is used for the sub-scanning direction.

As to the one or more example embodiments of the present invention, the deflection angle means a deflection angle range where an image can be generated on the image generation element 206 by using the image displaying beam 101, which is different from the deflection angle at the light deflector 201. In other words, the deflection angle of the example embodiments is different from the angle range defined by two end points in the main scanning direction where the scanning operation is changed from one direction to the opposite direction, that is the angle range defined by the two points in the main scanning direction where the scanning operation by the light deflector 201 stops for a moment.

The light deflected by the light deflector 201 scans the image generation element 206 in the main scanning direction with a deflection area $\omega 11$ and in the sub-scanning direction with a deflection area $\omega 12$ as indicated in FIGS. 8A and 9. As indicated in FIGS. 8A and 9, the deflection area $\omega 11$ can be set as $\omega 11=\pm 26$ (deg), which corresponds to the deflection angle of ±13 (deg) on the reflection face, and the deflection area $\omega 12$ can be set as $\omega 12=\pm 10$ (deg), which corresponds to the deflection angle of ±5 (deg) on the reflection face. As indicated in FIGS. 8A and 9, one deflection area $\omega 11$ is set as $\omega 11=+26$ (deg) and another one deflection area $\omega 11$ is set as $\omega 11=-26$ (deg) with respect to the center of the main scanning direction for the image generation element 206, and one deflection area $\omega 12$ is set as $\omega 12=+10$ (deg) and another one deflection area $\omega 12$ is set as $\omega 12=-10$ (deg) with respect to the center of the sub-scanning direction for the image generation element 206.

In this example configuration, the image displaying beam 101 emitted from the light source unit 100 and directed to the image generation element 206 enters the light deflector 201 with an angle $\beta 1=40$ (deg) in the main scanning direction relative to the center of the deflection scanning area. Therefore, when the deflection angle at the light deflector 201 is 0 (deg) and the image displaying beam 101 enters the light deflector 201 with an incidence angle of 20 (deg) to the light deflector 201, the image displaying beam 101 reaches the center of the deflection scanning area of the image generation element 206.

As described above, the image generation element 206 is an element where the intermediate image is generated by focusing the light emitted from the light source unit 100, and the image generation element 206 has the micro convex lens structure, which is known as the micro lens array.

The light flux separating element 203, which can be used as the light separator, is disposed at a position on the light path between the light source unit 100 and the light deflector 201, in which the image displaying beam 101 travels along the light path from the light source unit 100 to the light deflector 201. Specifically, the light flux separating element 203 separates the image displaying beam 101 into the scan-use light directed to the image generation element 206, and the control-use light 102 in the main scanning direction. The light flux separating element 203 can employ, for example, a polarizing beam splitter, and a reflective neutral density (ND) filter.

The control-use light 102 separated from the image displaying beam 101 is reflected by the reflection face 204, then enters the light deflector 201 with an incidence angle different from an incidence angle of the image displaying beam 101 to the light deflector 201, and then the control-use light 102 scans positions different from the positions of the image generation element 206. If the control-use light 102 enters the image generation element 206, the control-use light 102 becomes a ghost light and degrades the image quality significantly.

In view of this issue, as to the optical scanning system 200, when the deflection area "$\omega 11$" is set for the image displaying beam 101 directed to the image generation element 206, an angle "$\alpha 1$" is set between the incidence angle of the image displaying beam 101 to the light deflector 201 and the incidence angle of the control-use light 102 to the light deflector 201 with an angle value greater than the deflection area "$\omega 11$" in the light separation direction such as the main scanning direction. For example, $\omega 11=\pm 26$ (deg) corresponding to the imaging angle=52 (deg), and $\alpha 1=54$ (deg) are set.

As to conventional optical scanning systems not separating the image displaying beam and the control-use light by using the light flux separating element, the interference of the image displaying beam and the control-use light can be prevented by disposing the light receiving element and the scan-receiving element with a given interval. Therefore, as to conventional optical scanning systems, if the light receiving element is disposed near the scan-receiving element, the deflection angle for scanning the scan-receiving element is required to be smaller than the maximum deflection angle of the light deflector. Therefore, as to conventional optical scanning systems, the light intensity that can be used for displaying the image for one scanning operation in the main scanning direction decreases, which means the light use efficiency of the light source unit becomes lower, and thereby a brighter image cannot be generated.

By contrast, as to the optical scanning system 200, as above described, the image displaying beam 101 directed to the image generation element 206 and the control-use light 102 directed to the light receiving element 205 are separated. Therefore, the interference of the image displaying beam 101 and the control-use light 102 can be prevented. In this configuration, the image generation element 206 can be set at a position by considering the light emission timing of the light source unit 10 based on a control signal transmitted from the light receiving element 205, with which the deflection angle of the light deflector 201 can be set closer to the theoretical maximum deflection angle of the light deflector 201. Specifically, as to the optical scanning system 200, an imaging area on the image generation element 206 can be set in view of a light reaching position of the control-use light 102 directed to the light receiving element 205.

By employing the above described configuration for to the optical scanning system 200, the image displaying beam 101 directed to the image generation element 206 and the control-use light 102 directed to the light receiving element 205 do not interfere with each other, and thereby the quality of image generated on the image generation element 206 can be enhanced.

Further, as to the one or more example embodiments of the present invention, after the light flux separating element 203 separates the light into the image displaying beam 101 to be directed to the image generation element 206, and the control-use light 102 to be directed to the light receiving element 205, the image displaying beam 101 and the control-use light 102 enters the light deflector 201 independently. Therefore, the deflection angle of the light deflector 201 used for the image generation can be set greater.

As to the optical scanning system 200, the transmission efficiency of light from the light source unit 100 to the image generation element 206 can be enhanced. Therefore, the dynamic range of the light used for the image projection can be set greater.

Further, as to the optical scanning system 200, when the light flux separating element 203 separates the image displaying beam 101 and the control-use light 102, the light quantity of the image displaying beam 101 is set greater than the light quantity of the control-use light 102 to generate brighter images while the light quantity of the control-use light 102 directed to the light receiving element 205 can be set with a value that is minimally required based on the sensitivity level of the light receiving element 205. Therefore, the greater light quantity can be set for the image displaying beam 101 by enhancing the sensitivity of the light receiving element 205.

As to the HUD 1000, the size of the intermediate image can be determined from the magnification ratio of the optical projection system 300 and the size of the virtual image 12. As to the optical scanning system 200, since the deflection angle of the light deflector 201 can be set greater, the distance between the light deflector 201 and the image generation element 206 can be set shorter. As to the HUD 1000, the optical scanning system 200 includes, for example, the lens 150 disposed before the light deflector 201. Since the focal length of the lens 150 can set smaller, the numerical aperture (NA) can be set greater. Therefore, as to the HUD 1000, the beam spot diameter of the image displaying beam 101 focused on the image generation element 206 can be set smaller, and thereby an image can be generated with higher quality.

Optical Scanning System: Second Example Embodiment

Figure 8B:
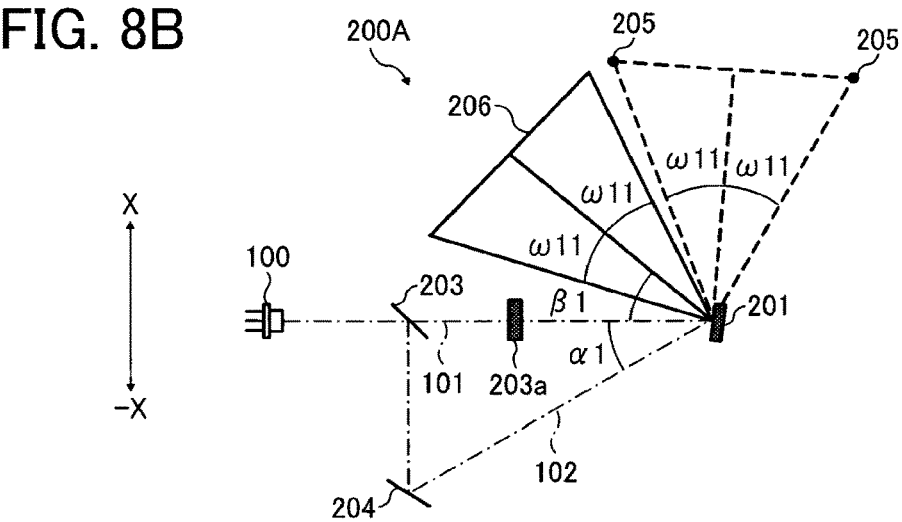
FIG. 8B is a cross-section view of an optical arrangement in the X-axis direction in the optical scanning system of a second example embodiment.

A description is given of an optical scanning system 200A of a second example embodiment of employed for the HUD 1000 with reference to FIG. 8B, in which different points from the optical scanning system 200 are described.

As indicated in FIG. 8B, the optical scanning system 200A includes a light quantity changeable element 203a disposed at a position between the light flux separating element 203 and the light deflector 201 to change the light quantity of the image displaying beam 101 directed to the image generation element 206 and the light quantity of the control-use light 102 directed to the light receiving element 205. The light quantity changeable element 203a can employ, for example, a neutral density (ND) filter and a polarizer that can change light quantity of light. Further, a plurality of ND filters used for separating the light with different light quantity can be set, in which the plurality of ND filters is switched so that the dynamic range corresponding to the required light quantity can be set.

As to the optical scanning system 200A, the brightness of image can be changed by changing the light quantity of the image displaying beam 101 directed to the image generation element 206 without changing the light quantity of the control-use light 102 directed to the light receiving element 205. Therefore, as to the optical scanning system, the dynamic range of light quantity used for image displaying can be changed without affecting the control-use light 102 directed to the light receiving element 205.

Optical Scanning System: Third Example Embodiment

A description is given of an optical scanning system 200B of a third example embodiment employed for the HUD 1000, in which different points from the previously described optical scanning system 200 are described.

Figure 10:
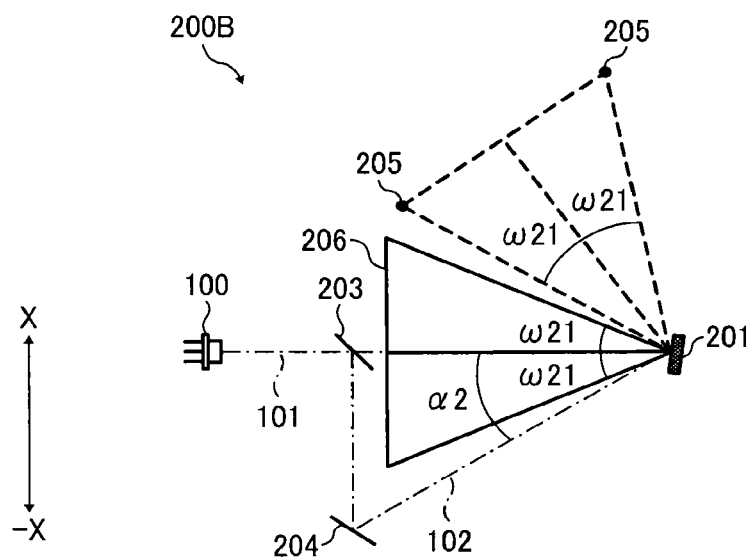
FIG. 10 is a cross-section view of an optical arrangement in the X-axis direction in an optical scanning system of a third example embodiment.

As illustrated in FIG. 10, the image displaying beam 101 emitted from the light source unit 100 enters the light deflector 201 along a direction perpendicular to the main scanning direction, and the direction of image displaying beam 101 is aligned with the center of the deflection scanning area by the light deflector 201 in the main scanning direction. In this configuration, the image displaying beam 101 that has entered the light deflector 201 is reflected to the image generation element 206, disposed at the incidence direction side, in the deflection area $\omega 21=\pm 26$ (deg) corresponding to the imaging angle=52 (deg). Therefore, the center of the deflection scanning area (i.e., the center of the $\pm \omega 21$) and the incident light to the light deflector 201 has no angle with each other as illustrated in FIG. 10.

Figure 11:
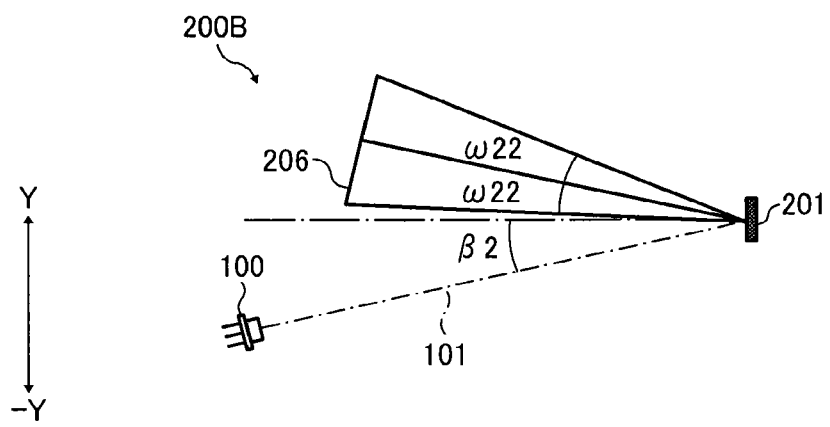
FIG. 11 is a cross-section view of an optical arrangement in the Y-axis direction in the optical scanning system of FIG. 10.

As illustrated in FIG. 11, the image displaying beam 101 enters the light deflector 201 outside the deflection angle of the light deflector 201 in the sub-scanning direction. For example, the image displaying beam 101 enters the light deflector 201 with an angle $\beta 2=13$ (deg) and then the light deflector 201 deflects the image displaying beam 101 to the center of the deflection scanning area of the light deflector 201, which corresponds to the center of the image generation element 206, in which the image displaying beam 101 is reflected to the image generation element 206 by the light deflector 201 in the deflection area $\omega 22=\pm 10$ (deg) corresponding to the imaging angle=20 (deg). As illustrated in FIG. 11, both of the incident light to the light deflector 201 and the exit light from the light deflector 201 (i.e., the image displaying beam 101 that enters and exits from the light deflector 201) exist in one cross-sectional face in the sub-scanning direction.

The control-use light 102 directed to the light receiving element 205 is separated from the image displaying beam 101 by the light flux separating element 203. After the separation by the light flux separating element 203, the control-use light 102 is reflected at the reflection face 204, and enters the light deflector 201 in the main scanning direction with an angle α2=54 (deg).

If the control-use light 102 directed to the light receiving element 205 is separated in the main scanning direction, and the control-use light 102 enters the light deflector 201 from the outside the deflection angle range of the light deflector 201 in the main scanning direction, the optical configuration arrangement in the main scanning direction becomes greater, and thereby the configuration of the apparatus becomes greater. Further, if this optical configuration arrangement is employed, the light-existing area that enters the light deflector 201 and the light-existing area that exits from the light deflector 201 becomes greater, and thereby the reduction of size configuration of the apparatus may become difficult.

The incidence angle of the image displaying beam 101 to the light deflector 201 can be set smaller to reduce the size configuration of the apparatus. However, it is required to set the angle β1, which is the angle set by the light source unit 100 and the image generation element 206 (see FIG. 8A), at least greater than a half of the deflection angle (i.e., one ω11) in the main scanning direction. Further, when the above described light quantity changeable element 203a is disposed on the light path of the control-use light 102, the interference of the light deflected at the light deflector 201 and the light receiving element 205 is required to be prevented. In this case, the incidence angle of the image displaying beam 101 to the light deflector 201 in the main scanning direction is difficult to set smaller.

Further, the imaging angle of the deflection area of the light deflector 201 in the main scanning direction can be set smaller, but if the imaging angle of the deflection area of the light deflector 201 in the main scanning direction becomes smaller, the distance between the light deflector 201 and the image generation element 206 is required to be set greater to secure the sufficient size of the image generation element 206.

Further, the MEMS device used for the light deflector 201, the mirror is sealed by glass. Therefore, the incidence and exit of light for the reflection face of the light deflector 201 are performed via glass.

As to the optical scanning system 200B, the size configuration of the apparatus can be reduced by entering the image displaying beam 101 to the light deflector 201 from outside the deflection angle range of the light deflector 201 in the sub-scanning direction. As to the optical scanning system 200B, since the direction of incidence angle of the image displaying beam 101 to the light deflector 201 can be aligned with the center of the deflection scanning area by the light deflector 201 as indicated in FIG. 10, the size configuration of the apparatus along the main scanning direction can be reduced greatly.

Further, while the total angle range of light that enters and exits the light deflector 201 becomes at least 174 (deg) for the above described optical scanning system 200, the total angle range of light that enters and exits the light deflector 201 becomes 134 (deg) for the optical scanning system 200B, and thereby the size configuration of the MEMS device can be further reduced. When the HUD 1000 is mounted to the vehicle, the HUD 1000 is disposed in a dashboard of the vehicle that is behind an instrument panel used for displaying velocity information. Therefore, the optical scanning system 200B having the reduced size configuration can be applied to the HUD 1000 mounted to the vehicle.

Optical Scanning System: Fourth Example Embodiment

A description is given of an optical scanning system 200C of a fourth example embodiment employed for the HUD 1000, in which different points from the previously described optical scanning systems 200, 200A and 200B are described.

Figure 12:
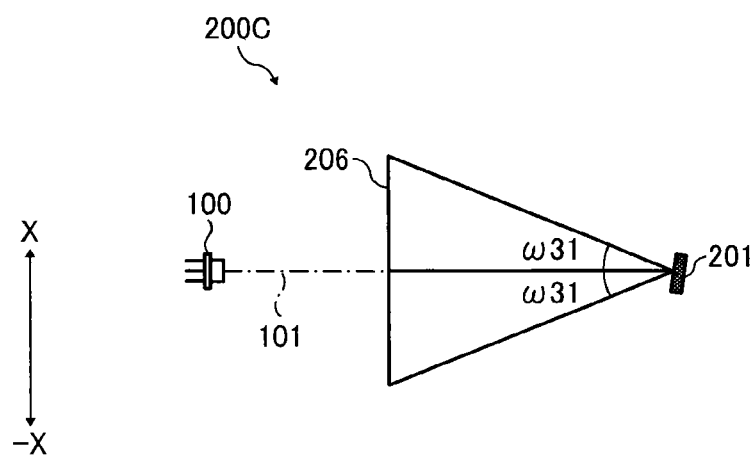
FIG. 12 is a cross-section view of an optical arrangement in the X-axis direction in an optical scanning system of a fourth example embodiment.

As illustrated in FIG. 12, the image displaying beam 101 emitted from the light source unit 100 enters the light deflector 201 along a direction perpendicular to the main scanning direction, and the direction of image displaying beam 101 is aligned with the center of the deflection scanning area by the light deflector 201. In this configuration, the image displaying beam 101 that has entered the light deflector 201 is reflected to the image generation element 206, disposed at the incidence direction side, in the deflection area ω31=±26 deg corresponding to the imaging angle=52 (deg). Therefore, the center of the deflection scanning area (i.e., the center of the ±ω31) and the incident light to the light deflector 201 has no angle with each other as illustrated in FIG. 12.

Figure 13:
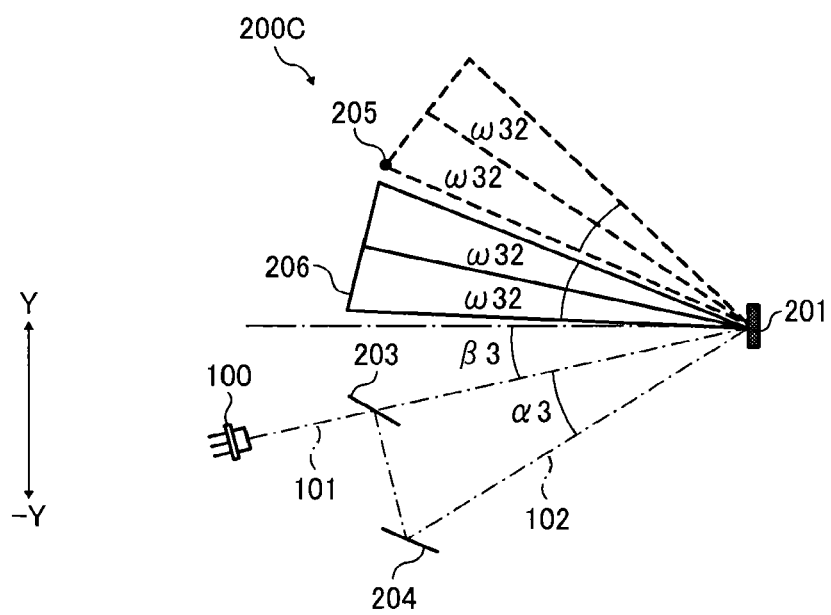
FIG. 13 is a cross-section view of an optical arrangement in the Y-axis direction in the optical scanning system of FIG. 12.

As illustrated in FIG. 13, the image displaying beam 101 enters the light deflector 201 from outside the deflection angle of the light deflector 201 in the sub-scanning direction. For example, the image displaying beam 101 enters the light deflector 201 with an angle β3=13 (deg) and then the light deflector 201 deflects the image displaying beam 101 to the center of the deflection scanning area of the light deflector 201, which corresponds to the center of the image generation element 206, in which the image displaying beam 101 is reflected to the image generation element 206 by the light deflector 201 in the deflection area ω32=±10 (deg) corresponding to the imaging angle=20 (deg). As illustrated in FIG. 13, both of the incident light to the light deflector 201 and the exit light from the light deflector 201 (i.e., the image displaying beam 101 that enters and exits from the light deflector 201) exist in one cross-sectional face in the sub-scanning direction.

The control-use light 102 directed to the light receiving element 205 is separated from the image displaying beam 101 in the sub-scanning direction by the light flux separating element 203. After the separation by the light flux separating element 203, the control-use light 102 is reflected at the reflection face 204, and enters the light deflector 201 in the sub-scanning direction with an angle α3=22 (deg).

As to the optical scanning system 200C, the imaging angle=20 (deg) of the deflection area in the sub-scanning direction is small compared to the imaging angle=52 (deg) of the deflection area in the main scanning direction. Further, as to the image displaying beam 101 directed to the image generation element 206, the incidence angle of the image displaying beam 101 to the light deflector 201 is set with the angle β3=13 (deg) in the sub-scanning direction. Therefore, as to the optical scanning system 200C, when an angle of the light deflector 201 with respect to the sub-scanning direction is 0 (deg), the incidence light that enters the light deflector

201 with the angle of 13 (deg) is reflected to the center position of the image generation element 206 in the sub-scanning direction.

The control-use light 102 separated in the sub-scanning direction has a differential angle of 20 (deg) or more relative to the image displaying beam 101 directed to the image generation element 206 in the sub-scanning direction such as at least an angle $\alpha 3=22$ (deg). In this case, as to the optical scanning system 200C, the total angle range of light that enters and exits the light deflector 201 becomes 80 (deg) in the main scanning direction.

Since the imaging angle of the deflection area is 52 (deg) in the main scanning direction for the optical scanning system 200C, the size configuration of the apparatus employing the optical scanning system 200C can be further reduced compared to the previously described optical scanning system 200, 200A and 200B. As to the optical scanning system 200C, the total angle range of light that enters and exits the light deflector 201 becomes 82 (deg) while the imaging angle of 20 (deg) is set for the deflection area in the sub-scanning direction. The HUD 1000 can selectively employ an optical configuration arrangement for the optical scanning system such as the optical scanning systems 200, 200A, 200B, and 200C based on the available arrangement space.

As to the optical scanning system 200C, by disposing the light receiving element 205 scannable by the control-use light 102 by using the light deflector 201 at a position close to the image generation element 206, the size configuration of the apparatus in the sub-scanning direction can be further reduced.

As to the cross-sectional face of the optical scanning system 200C in the sub-scanning direction illustrated in FIG. 13, when the scanning operation proceeds from the upper to lower sides in the sub-scanning direction, after the light receiving element 205 detects the light, the light deflector 201 moves to the upper direction and starts the scanning operation, which means that a timing signal is acquired at the rear-end of scanning. By contrast, when the scanning operation proceeds from the lower to upper sides in the sub-scanning direction, a timing signal is acquired at the front-end of scanning. As to the optical scanning system 200C, the light quantity of control-use light 102 deflected at the light deflector 201 can be reduced. For example, the light quantity of control-use light 102 can be reduced by setting a glass area of MEMS device of the light deflector 201 smaller. As to the optical scanning system 200C, by setting the glass area of the light deflector 201 smaller, the cost can be reduced, and unnecessary light is not scanned, with which the image deterioration caused by a ghost light can be prevented.

Further, as to the optical scanning system 200C, the total angle range of light that enters and exits from the light deflector 201 becomes about 60 (deg). Therefore, the size configuration of the apparatus can be further reduced.

Optical Scanning System: Fifth Example Embodiment

A description is given of an optical scanning system 200D of a fifth example embodiment employed for the HUD 1000, in which different points from the previously described optical scanning systems 200, 200A, 200B, and 200C are described.

Figure 14:
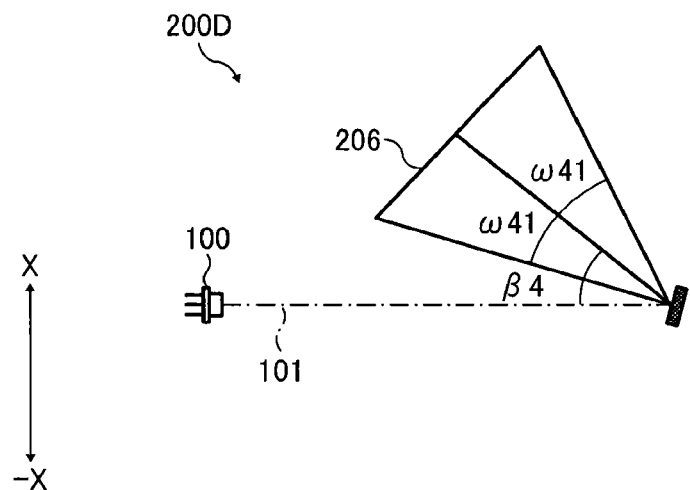
FIG. 14 is a cross-section view of an optical arrangement in the X-axis direction in an optical scanning system of a fifth example embodiment.

As illustrated in FIG. 14, the image displaying beam 101 emitted from the light source unit 100 enters the light deflector 201 with an angle of $\beta 4=40$ (deg) to enter the center of the deflection scanning area in the main scanning direction. The image displaying beam 101 that has entered the light deflector 201 is reflected to the image generation element 206 disposed at the incidence direction side with the deflection area $\omega 41=\pm 26$ (deg) corresponding the imaging angle=$\pm 52$ (deg).

Figure 15:
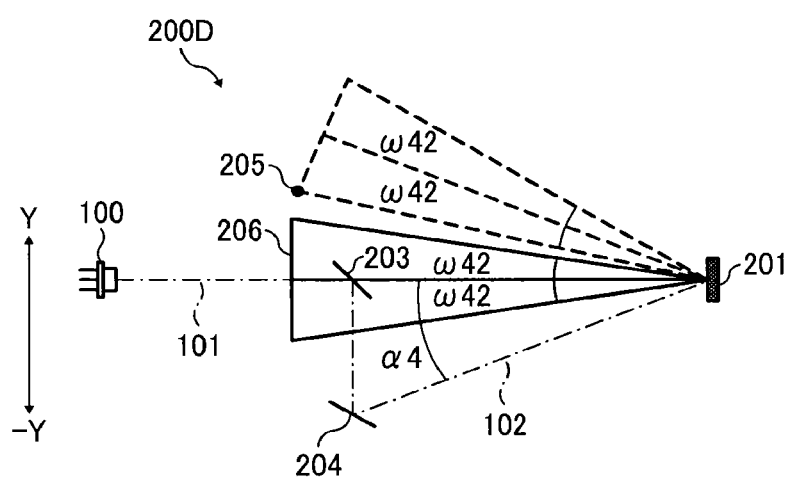
FIG. 15 is a cross-section view of an optical arrangement in the Y-axis direction in the optical scanning system of FIG. 14.

As illustrated in FIG. 15, the image displaying beam 101 emitted from the light source unit 100 enters the light deflector 201 along a direction perpendicular to the sub-scanning direction, and the direction of image displaying beam 101 is aligned with the center of the deflection scanning area by the light deflector 201 in the sub-scanning direction. In this configuration, the image displaying beam 101 that has entered the light deflector 201 is reflected to the image generation element 206, disposed at the incidence direction side, in the deflection area $\omega 42=\pm 10$ (deg) corresponding to the imaging angle=20 (deg). As illustrated in FIG. 15, both of the incident light to the light deflector 201 and the exit light from the light deflector 201 (i.e., the image displaying beam 101 that enters and exits from the light deflector 201) exist in one cross-sectional face in the sub-scanning direction.

The control-use light 102 directed to the light receiving element 205 is separated from the image displaying beam 101 in the sub-scanning direction by the light flux separating element 203. After the separation by the light flux separating element 203, the control-use light 102 is reflected at the reflection face 204, and enters the light deflector 201 in the sub-scanning direction with an angle $\alpha 4=22$ (deg).

Different from the optical scanning system 200C, as to the optical scanning system 200D, the image displaying beam 101 enters the light deflector 201 from outside the deflection area of the light deflector 201 in the main scanning direction. By entering the image displaying beam 101 to the light deflector 201 with setting an angle in the main scanning direction as indicated by the optical scanning system 200D, the size configuration of the apparatus in the sub-scanning direction can be reduced. In this case, the size configuration of the optical scanning system 200D in the main scanning direction becomes larger than the size configuration of the optical scanning system 200C in the main scanning direction. However, since the control-use light 102 is separated in the sub-scanning direction, the size configuration of the optical scanning system 200D can be reduced compared to the size configuration of the optical scanning system 200 and the optical scanning system 200B.

As to the optical scanning system 200D, the total angle range of light that enters and exits the light deflector 201 is set at least about 66 (deg) in the main scanning direction, and thereby the size configuration of the optical scanning system 200D can be reduced compared to the size configuration of the optical scanning systems 200, 200A, 200B, and 200C. Further, as to the optical scanning system 200D, since the total angle range of light that enters and exits the light deflector 201 is set about 34 (deg) in the sub-scanning direction, the size configuration of the apparatus in the sub-scanning direction can be further reduced.

As to the above described optical scanning systems of example embodiments, the optical configuration arrangement can be employed in view of the size required in the main scanning direction and the sub-scanning direction, with which the size configuration of the apparatus can be reduced.

As to the above described optical scanning systems of example embodiments, the dynamic range of light for generating an image can be set greater as above described, and thereby the light emitted from the light source unit 100 can be guided to the image generation element 206 with higher efficiency, and thereby bright images can be generated. Further, as to the above described optical scanning systems of example embodiments, even if the light quantity emitted from the light source unit 100 is reduced, the control-use light 102, which is a synchronization signal for determining a position of image, can be acquired securely.

Figure 16:
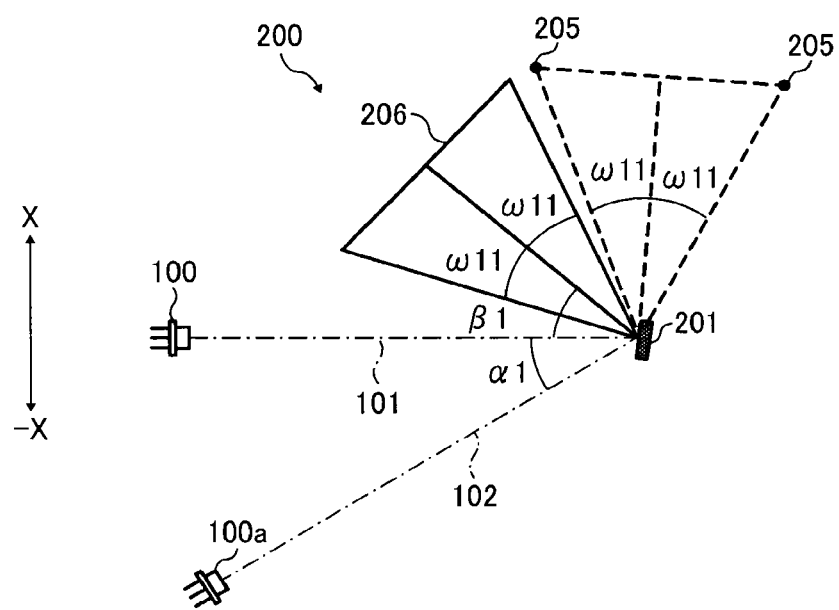
FIG. 16 is another cross-section view of an optical arrangement in the X-axis direction in the optical scanning system of the first example embodiment.

As to the above described optical scanning systems of example embodiments, the scan-use light and the control-use light are generated by using the same light source and then separated, but the optical configuration arrangement is not limited hereto. For example, as illustrated in FIG. 16, the scan-use light and the control-use light can be independently generated at different light sources such as the light source 100 and a light source 100a. The configuration of using the different light sources for the scan-use light and the control-use light can be applied to any one of the above described example embodiments.

The values of angle used for the above described optical scanning systems are just examples for comparing the angles, and not limited these. The values of angle used for the above described optical scanning systems can be changed in view of a light-existing area for scanning the light receiver.

As to the above described optical scanning systems of example embodiments of the present invention, the optical scanning system and the optical scanning apparatus can enhance the quality of image.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An optical scanning apparatus comprising:
   a light source to emit light;
   a light deflector having a reflection face to deflect the light as a scan-use light to scan an image generation element by oscillating the reflection face;
   a light receiving element to receive a control-use light to generate a signal used for controlling a scanning condition of the scan-use light; and
   a control unit to control the scanning condition of the light deflector based on the generated signal,
   wherein the scan-use light and the control-use light enter the light deflector as different light fluxes, and
   wherein the scan-use light enters the light deflector at an incidence angle that is different than an incidence angle at which the control-use light enters the light deflector such that the scan-use light and the control-use light travel in different travel directions from the light deflector.

2. The optical scanning apparatus of claim 1, further comprising a light separator to separate the light emitted from the light source into the scan-use light and the control-use light, and directs the scan-use light and the control-use light to the different travel directions.

3. The optical scanning apparatus of claim 1, wherein the light deflector oscillates the reflection face to scan the light receiving element by using the control-use light.

4. The optical scanning apparatus of claim 1, further comprising a light quantity changeable unit to set light quantity of the scan-use light and light quantity of the control-use light differently.

5. The optical scanning apparatus of claim 1, wherein the light deflector oscillates the reflection face to a first direction and a second direction perpendicular to the first direction, and the scan-use light is scanned to the first direction and the second direction by the light deflector.

6. The optical scanning apparatus of claim 2, wherein the light deflector oscillates the reflection face to a first direction and a second direction perpendicular to the first direction, and the scan-use light is scanned to the first direction and the second direction by the light deflector, and
   wherein the light separator separates the scan-use light to a direction of the light deflector, and the control-use light to the first direction.

7. The optical scanning apparatus of claim 5, wherein a deflection angle of the light deflector to the first direction is greater than a deflection angle of the light deflector to the second direction.

8. The optical scanning apparatus of claim 6, wherein an incidence angle of the control-use light to the light deflector in the first direction in view of an incidence angle of the scan-use light to the light deflector in the first direction is set greater than the deflection angle of the scan-use light by the light deflector.

9. The optical scanning apparatus of claim 2, wherein the light separator separates the scan-use light to a direction of the light deflector, and the control-use light to the second direction.

10. The optical scanning apparatus of claim 9, wherein the light receiving element scannable by the control-use light deflected by the light deflector is disposed at a position near the image generation element.

11. The optical scanning apparatus of claim 2, wherein in a direction that the control-use light is separated by the light separator, the incidence angle of the control-use light to the light deflector in view of the incidence angle of the scan-use light to the light deflector is set greater than the deflection angle of the scan-use light by the light deflector.

12. An image display apparatus comprising:
    the optical scanning apparatus of claim 1 to scan light emitted from the light source to the image generation element to generate an image; and
    an optical projection system to display the image generated by the image generation element as a virtual image.

13. A vehicle comprising:
    the optical scanning apparatus of claim 1 to scan light emitted from the light source to the image generation element to generate an image; and
    an optical projection system to display the image generated by the image generation element as a virtual image on a windshield of the vehicle.

14. The optical scanning apparatus of claim 1, wherein the light source includes a first light source which emits the scan-use light and a second light source which emits the control-use light.

15. The optical scanning apparatus of claim 2, wherein the light separator includes a light flux separating element including a polarizing beam splitter and a reflective neutral density filter.

* * * * *